United States Patent
Fierro et al.

(10) Patent No.: US 11,091,083 B1
(45) Date of Patent: Aug. 17, 2021

(54) INCLINED RETRACTING HOSE TRAY FOR TANK TRUCK

(71) Applicants: Frank Fierro, Midland, TX (US); Sidney Fierro, Midland, TX (US)

(72) Inventors: Frank Fierro, Midland, TX (US); Sidney Fierro, Midland, TX (US)

(*) Notice: Subject to any disclaimer, the term of this patent is extended or adjusted under 35 U.S.C. 154(b) by 0 days.

(21) Appl. No.: 17/013,945

(22) Filed: Sep. 8, 2020

(51) Int. Cl.
*B60P 3/22* (2006.01)
*F16L 3/18* (2006.01)

(52) U.S. Cl.
CPC .......... *B60P 3/2265* (2013.01); *B60P 3/2245* (2013.01); *F16L 3/18* (2013.01); *B60P 3/225* (2013.01); *B60P 3/2255* (2013.01)

(58) Field of Classification Search
CPC ....... B60P 3/2265; B60P 3/2245; B60P 3/225; B60P 3/2255; F16L 3/18
USPC .... 280/837, 838, 839, 4; 141/231, 266, 279, 141/281, 283, 284, 346, 347, 369, 373–4; 137/267, 587
See application file for complete search history.

(56) References Cited

U.S. PATENT DOCUMENTS

2018/0354409 A1* 12/2018 Maiorana .............. B60P 3/2205

FOREIGN PATENT DOCUMENTS

DE           2419470 A1 * 11/1975 ................ F16L 3/01

* cited by examiner

*Primary Examiner* — Hilary L Gutman
(74) *Attorney, Agent, or Firm* — William Lovin & Assoc., LLC; William R. Lovin

(57) ABSTRACT

The invention uses a multiplicity of stacked storage racks at least one of which is inclined wherein each rack is equipped with a powered mechanism for deploying and retracting a large diameter drain hose or vent hose. The at least one storage rack that is inclined is used to store a large diameter drain hose such that a flex is formed in the stored hose which is at a lowered elevation than the uncoupled end of the stored hose. By this means a stored large diameter drain hose can transport, and not spill, fluid from a previous use.

10 Claims, 6 Drawing Sheets

INCLINED RETRACTING HOSE TRAY FOR TANK TRUCK

CROSS-REFERENCE TO RELATED APPLICATIONS

Not applicable.

FIELD OF THE INVENTION

The invention relates generally to a hose tray under-mounted on the tank of a transport truck or trailer that is equipped with a mechanism for deploying and retracting more than one large diameter hose. More specifically, the invention relates to the use of a multiplicity of stacked, storage racks at least one of which is inclined wherein each rack is equipped with a powered mechanism deploying and retracting a large diameter drain hose and vent hose. The at least one storage rack that is inclined is used to store a large diameter drain hose such that the flexed end of the stored hose is lower than the coupling ends. By this means a stored large diameter drain hose can transport fluid from a previous use.

BACKGROUND OF THE INVENTION

Tank trucks universally require hoses to fill and/or discharge the tank no matter what the fluid is: water, liquid chemicals, and petroleum products are commonly transported.

One example is crude petroleum products. Crude oil is pumped from the earth and usually stored in banks of surface tanks. Eventually, the surface tanks must be emptied, and, in most cases, the tanks are not connected to a transport pipe. The tank must be emptied into a transport truck with its own tank or an attached trailer with its own tank. In either case, a hose connected between the storage tank where the oil is stored, and the storage tank associated with the transport truck must be used.

Ordinarily, nitrile hoses reinforced with rubber are used and these are supplied in a variety of lengths. Generally, the feed hose is carried preconnected to the pump on the oil transport trailer with its other end freely supported on the truck. Current standards call for a matching vent hose from the trailer's vent port to be connected to the oil storage tank's vent port.

What is needed is a storage rack, attached to the underside of the tank on the tank trailer or tank truck, that can store both the feed hose and the vent hose in a bent configuration such that the two halves of each hose are coplanar with each other.

Also, what is needed is a storage rack where the feed hose is stored lower where the feed hose is bent than it is at both terminal ends of the feed hose.

Also, what is needed is a storage rack where the vent hose is stored horizontal to the plane of the earth.

Finally, what is needed is a storage rack which selectably retracts each hose when they are extended.

SUMMARY OF THE INVENTION

According to a first embodiment of the present invention, a double level storage rack is affixed to the central portion of a tank truck or a tank trailer. The top rack is coplanar with the horizontal plane of the tank truck or tank trailer. The lower rack is tilted such that the end closest to the pump affixed to the tank truck or the tank trailer (where one end of the feed hose is attached to the pump) is higher than the other end. The lower end is tilted at least 2° down away from the end of the storage tray near the pump.

Ordinarily, the pump on a tank truck or a tank trailer is placed near the power take off (PTO) of the tank truck or tank trailer. Generally, this is near the front of the tank truck or tank trailer. The feed hose is attached at one end to the pump.

Ordinarily, the vent pipe on the tank truck or tank trailer is near the end of the tank truck or tank trailer. Because of this, one end of the vent hose is attached to the end of the vent pipe near the end of the tank truck or tank trailer.

Both storage racks are constructed with identical components and in identical ways. Ordinarily, they are merely reversed horizontally with respect to one another.

Each storage rack is equipped with a vertical exit plate with an exit hole mounted at one end of each rack where the coupling for the hose stored in the rack exits the rack towards the outside. A fixed plate is mounted generally perpendicularly to each exit plate from one side to the other side of each rack at the same linear position as the fixed plate.

On each fixed plate there are two hose rollers. The hose rollers are arranged so that the hose stored in the rack exits between them. Specifically, the first hose roller closest to the end of the storage rack is mounted somewhat inboard towards the centerline of the rack relative to the second hose roller which is mounted closer to the exit plate. One having skill in the art will recognize that both hose rollers themselves might be mounted on a circularly formed rotating structure inset into, or just above, each fixed plate. This rotating structure allows the hose rollers to keep their orientation to the hose ideally configured at all times.

On each rack is a movable plate which moves linearly along each rack. Each movable plate is constructed with at least four wheel or roller assemblies on its bottom surface at the side edges of the movable plate. The wheel or roller assemblies run on top of, or inside channels, formed in the long side elements of each storage rack. There are three hose rollers on each movable plate.

The hose rollers may be deployed in one of two differing geometries. The present invention is constructed showing both of the geometries in use, both those having skill in the art will recognize that either geometry may appear on either rack. Specifically, the top rack of the first embodiment of the present invention has its movable plate configured such that the outboard hose rollers are further away from the fixed plate than the center hose roller. Alternatively, the bottom rack of the first embodiment of the present invention has its movable plate configured such that the outboard hose rollers are closer to the fixed plate than the center hose roller is. Regardless of the geometry used to guide the hoses on the racks, the hose runs around the center hose wheel and between the outer hose wheels. Each hose wheel attached to either the fixed plate or the movable plate is attached by means of a central pin. The central pin is threaded or may be welded in place.

At the end of each storage rack away from each fixed plate is a retracting mechanism which is affixed to the movable plate by means of at least one cable. The retracting mechanism is spring loaded. In this embodiment of the present invention, two spring powered motors are provided, one at each end of a cable spool, such that as the hose is withdrawn from the rack, the spring powered motors are wound up as cables affixed between the cable spool and the movable plate are extended. When the user wishes to retract the hose, the user activates a switching mechanism which releases the spring powered motors and the tension in each spring powered motor causes the cable spool to rewind, thus causing the associated movable plate to be moved back towards the cable spool and the spring powered motors. This in turn retracts the hose and stores it in its associated storage rack.

DETAILED DESCRIPTION OF THE EMBODIMENTS

Figure 1:
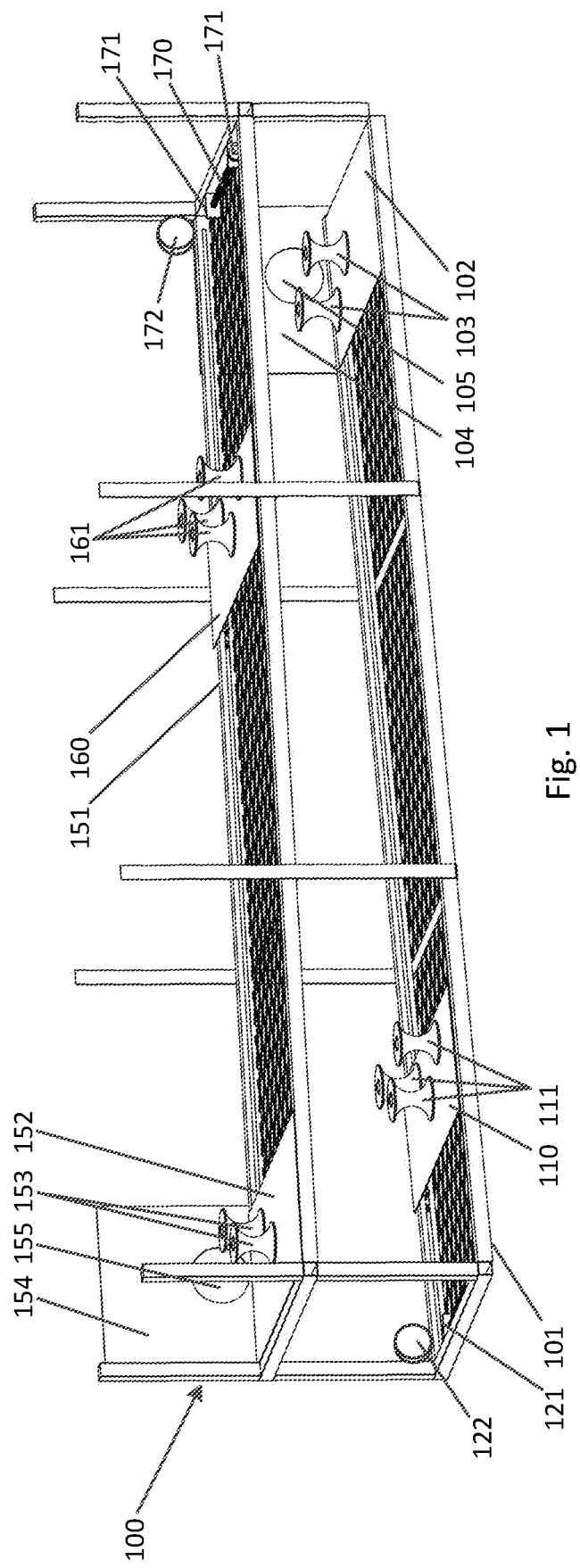
FIG. 1 is an oblique, reverse view of the inclined, retracting hose tray for tank truck.
Figure 2:
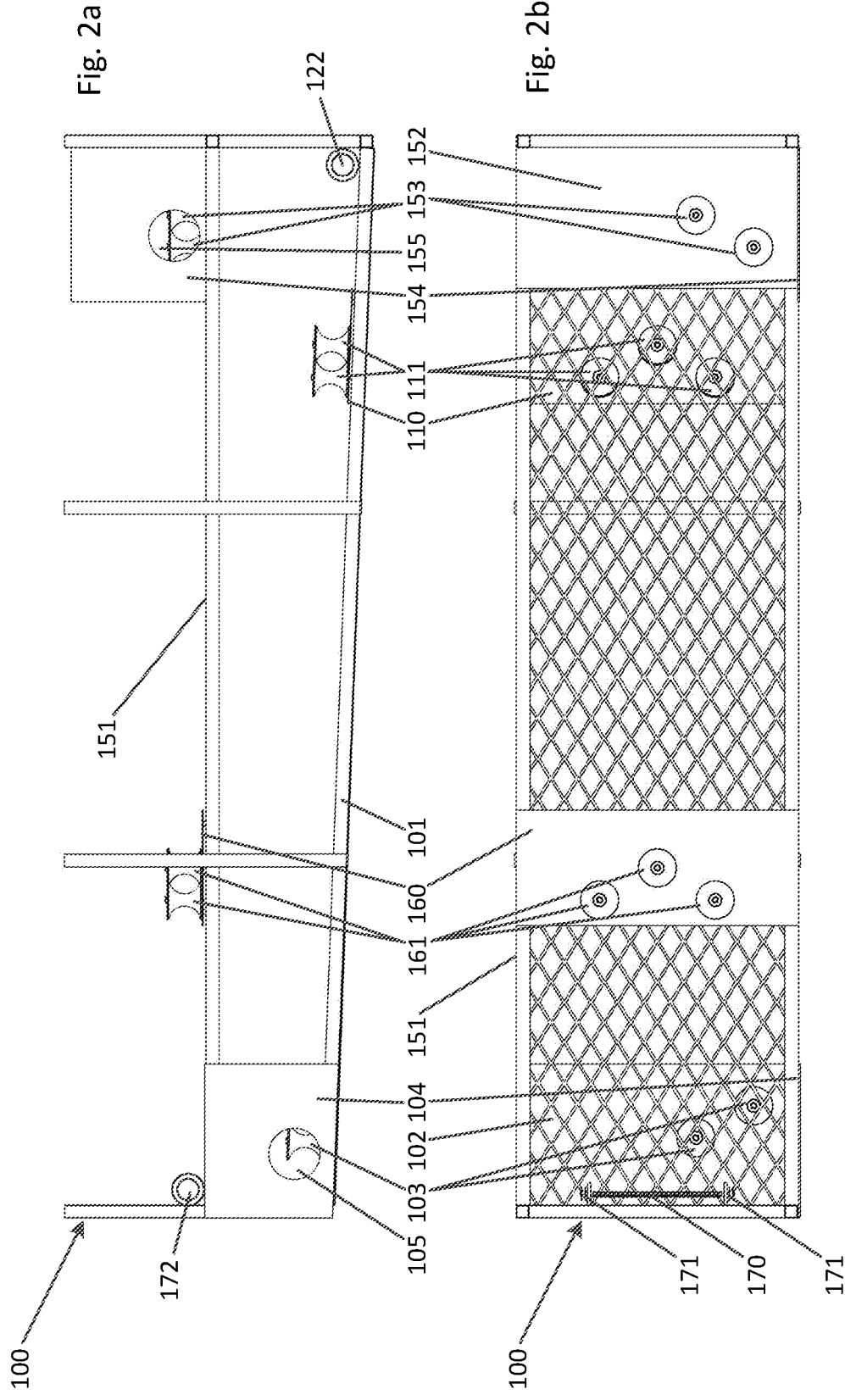
FIG. 2a is an elevation view of the inclined, retracting hose tray for tank truck.
FIG. 2b is a plan view of the inclined, retracting hose tray for tank truck.
Figure 3:
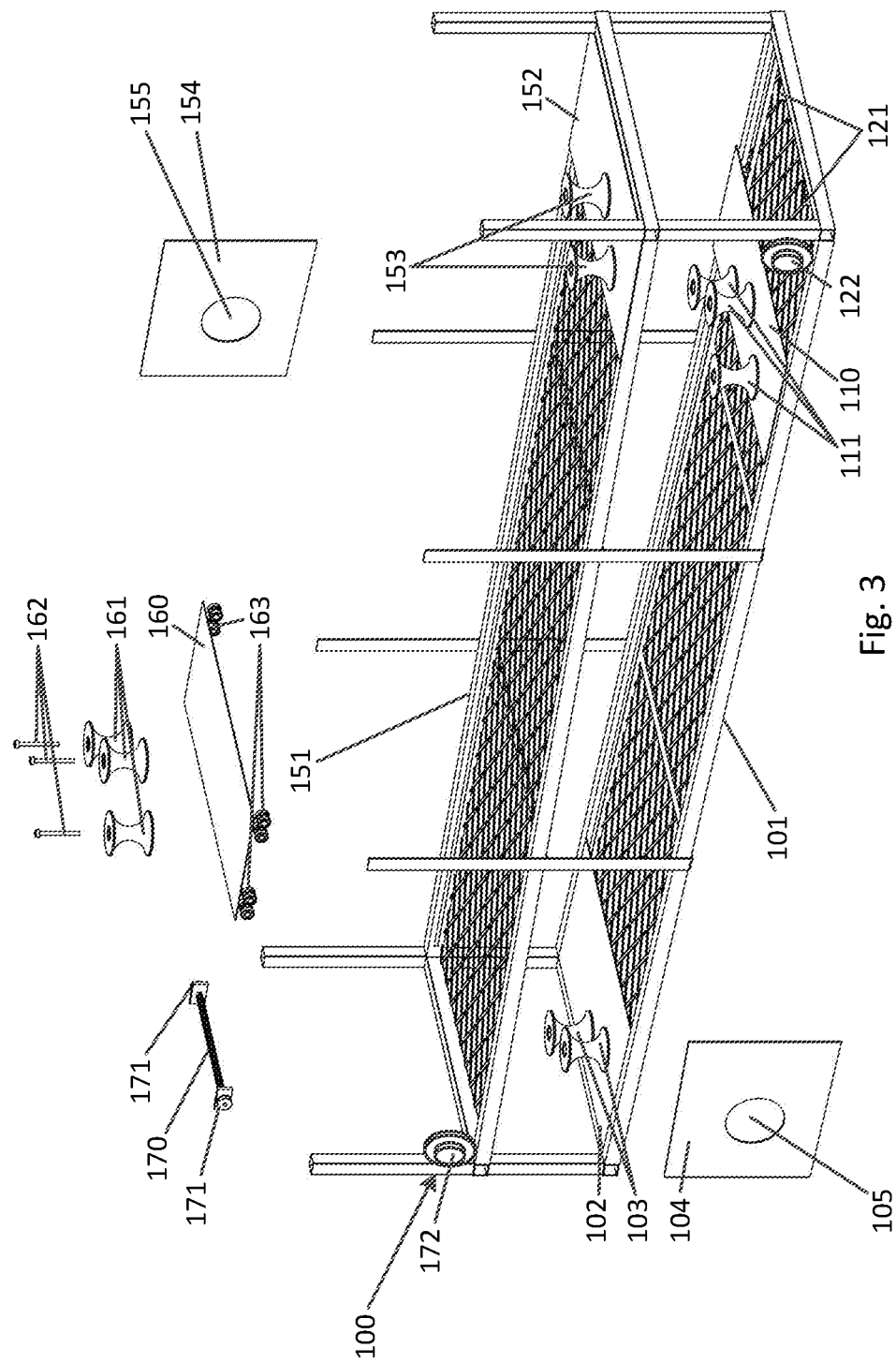
FIG. 3 is an exploded oblique view of the inclined, retracting hose tray for tank truck.
Figure 4:
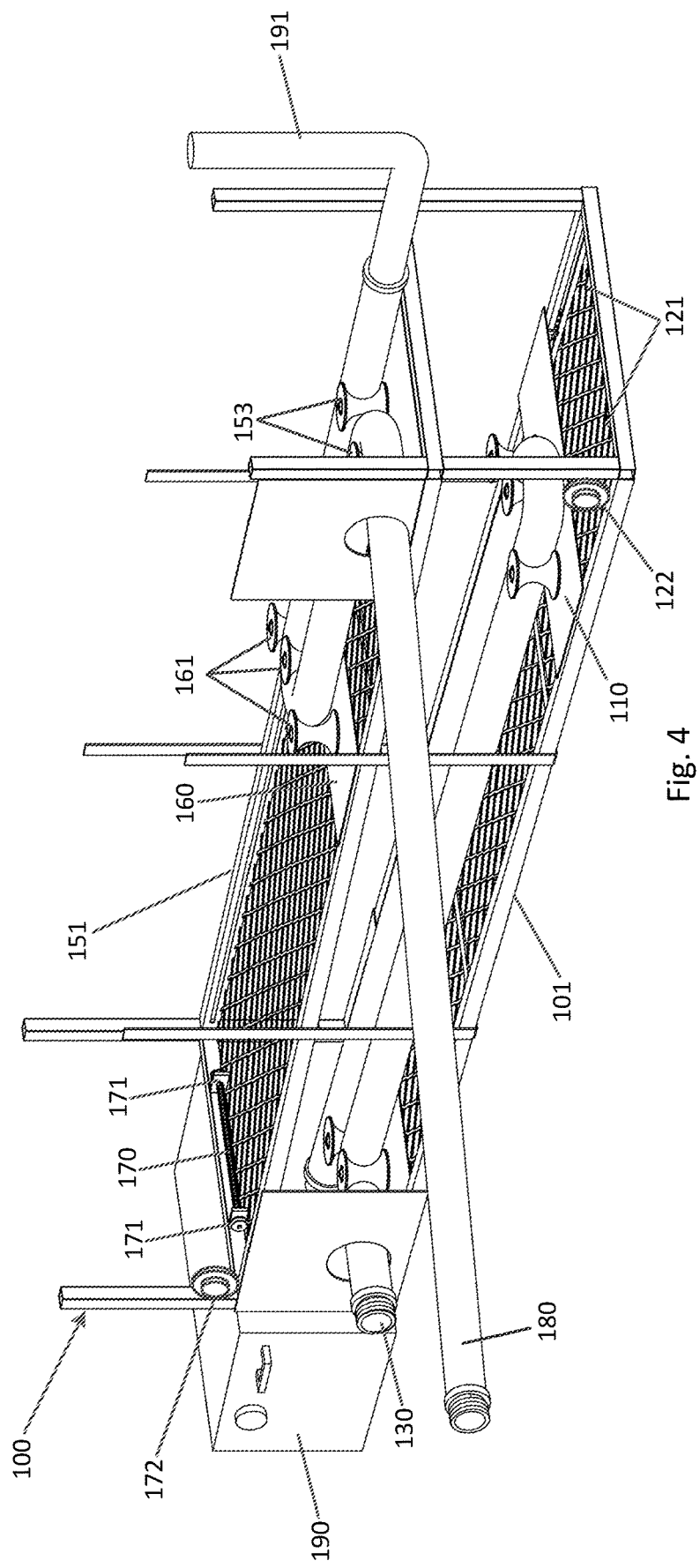
FIG. 4 is an oblique view of the inclined, retracting hose tray for tank truck showing how the device is used.
Figure 5:
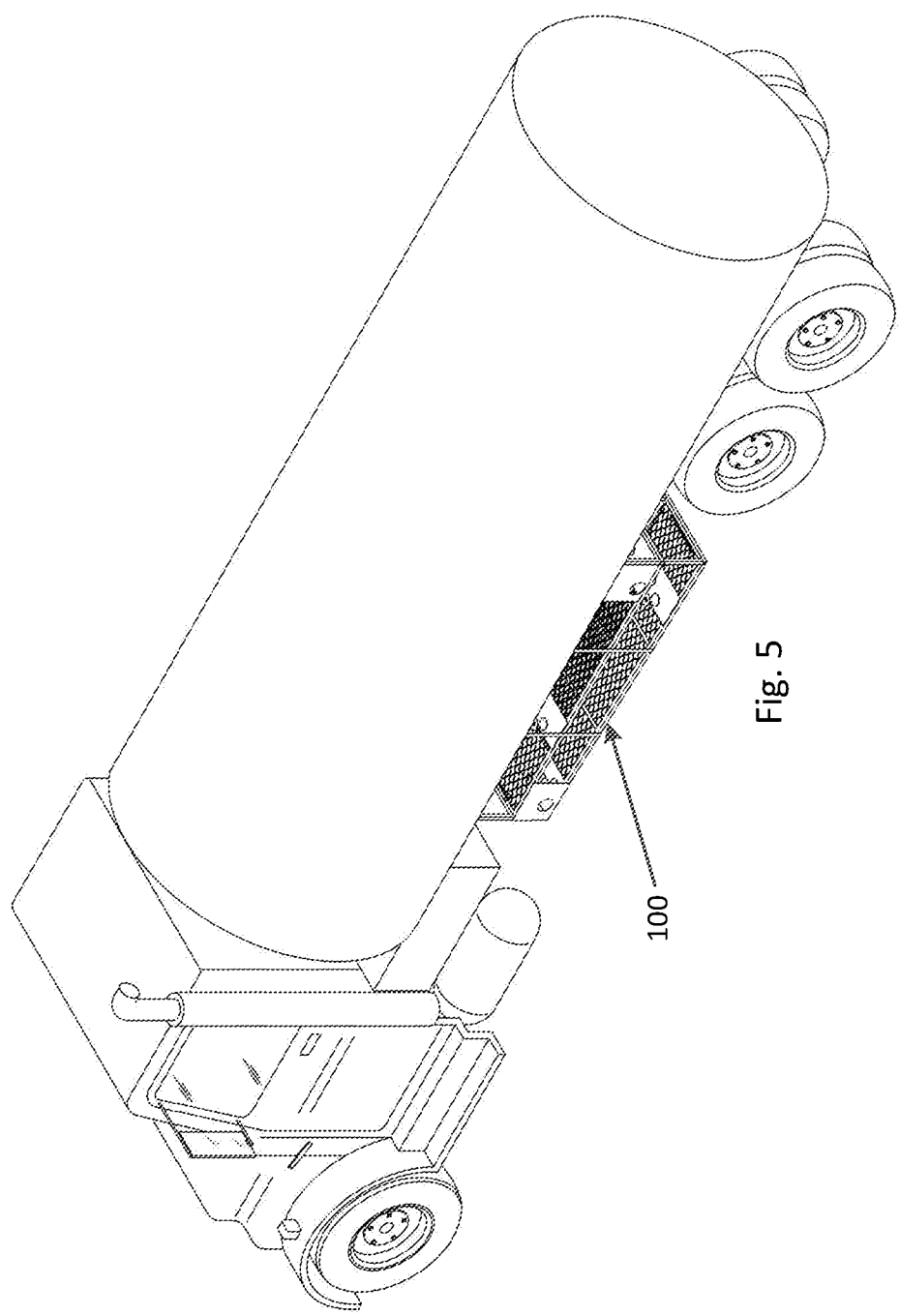
FIG. 5 is an oblique view of the inclined, retracting hose tray for tank truck affixed to a tank truck.
Figure 6:
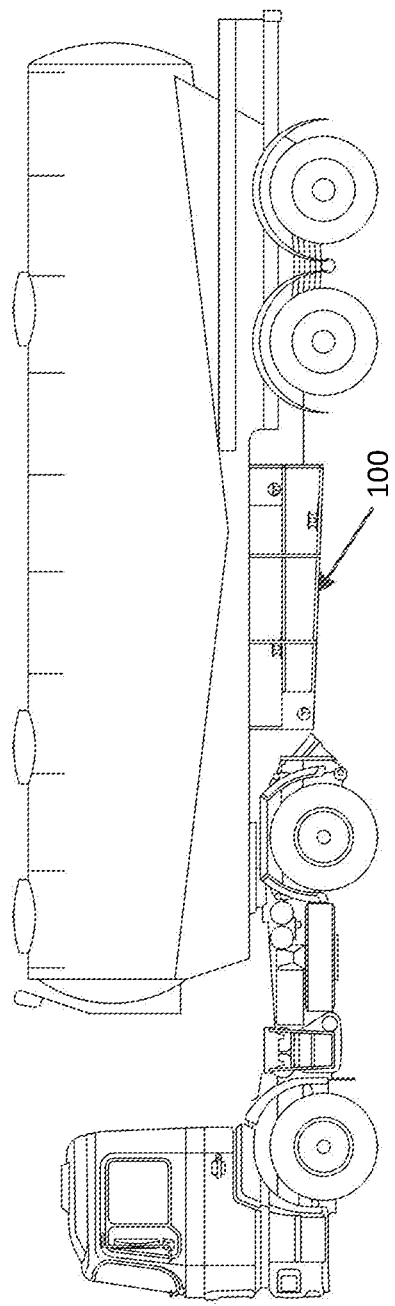
FIG. 6 is an elevation view of the inclined, retracting hose tray for tank truck affixed to a tank trailer.

Turning now to FIGS. 5 and 6, according to a first embodiment of the present invention, a double level storage rack 100 is affixed to the central portion of a tank truck (FIG. 5) or a tank trailer (FIG. 6). Turning now to FIGS. 1 through 4, the top storage rack 151 is coplanar with the horizontal plane of the tank truck or tank trailer. The lower storage rack 101 is tilted such that the end closest to the pump 190 affixed to the tank truck or the tank trailer (where one end of the feed hose is attached to the pump 190) is higher than the other end. The lower end is tilted at least 1° down away from the end of the storage tray near the pump 190. Those having skill in the art will recognize that different grades of liquid material with different densities may require larger tilt angles such as 2° or 3°. Also, those having skill in the art will recognize that alternative embodiments of the invention may have both storage racks tilted down away from their connection points to the pump 190 and the vent pipe 191.

Ordinarily, the pump 190 on a tank truck or a tank trailer is placed near the power take off (PTO) of the tank truck or tank trailer. Generally, this is near the front of the tank truck or tank trailer. The feed hose is attached at one end to the pump 190.

Ordinarily, the vent pipe 191 on the tank truck or tank trailer is near the end of the tank truck or tank trailer. Because of this, one end of the vent hose is attached to the end of the vent pipe 191 near the end of the tank truck or tank trailer.

Both storage racks 151 and 101 are constructed with identical components and in identical ways. Ordinarily, they are merely reversed horizontally with respect to one another.

Each storage rack 151 and 101 is equipped with a vertical exit plate 154 and 104 with an exit hole 155 and 105 mounted at one end of each rack where the coupling for the hose 180 and 130 stored in the rack exits the storage rack 151 and 101 towards the outside. A fixed plate 152 and 102 is mounted generally perpendicularly to each exit plate 154 and 104 from one side to the other side of each storage rack 151 and 101 at the same linear position as the fixed plate 152 and 102.

On each fixed plate there are two hose rollers 153 and 103. The hose rollers 153 and 103 are arranged so that the hose 180 and 130 stored in each storage rack 151 and 101 exits between them. Specifically, the first hose roller 153 and 103 closest to the end of the storage rack 151 and 101 is mounted somewhat inboard towards the centerline of the storage rack 151 and 101 relative to the second hose roller 153 and 103 which is mounted closer to the exit plate 154 and 104. One having skill in the art will recognize that both hose rollers 153 and 103 themselves might be mounted on a circularly formed rotating structure inset into, or just above, each fixed plate 152 or 102. This rotating structure allows the hose rollers 153 and 103 to keep their orientation to the hose ideally configured at all times.

On each storage rack 151 and 101 is a movable plate 160 and 110 which moves linearly along each storage rack 151 and 101. Each movable plate 160 and 110 is constructed with at least four wheel or roller assemblies 163 (and not visible) on its bottom surface at the side edges of the movable plate 160 and 110. The wheel or roller assemblies 163 (and not visible) run on top of, or inside channels, formed in the long side elements of each storage rack 151 and 101. There are three hose rollers 161 and 111 on each movable plate 160 and 110.

The hose rollers 161 and 111 may be deployed in one of two differing geometries. The present invention is constructed showing both of the geometries in use, but those having skill in the art will recognize that either geometry may appear on either rack. Specifically, the top storage rack 151 of the first embodiment of the present invention has its movable plate 160 configured such that the outboard hose rollers 161 are further away from the exit plate 154 than the center hose roller 161. Alternatively, the bottom storage rack 101 of the first embodiment of the present invention has its movable plate 110 configured such that the outboard hose rollers 111 are closer to the fixed plate 102 than the center hose roller 111 is. Regardless of the geometry used to guide the hoses 180 and 130 on the storage racks 151 and 101, the hoses 180 and 130 run around the center hose roller 161 and 111 and between the outer hose rollers 161 and 111. Each hose roller 161, 153, 111, and 103 is attached to either the fixed plate 152 and 102 or the movable plate 160 and 110 and is attached by means of a central pin 162 (and not shown). The central pin 162 (and not shown) is threaded or may be welded in place.

At the end of each storage rack 151 and 101 away from each fixed plate 152 and 102 is a retracting mechanism which is affixed to the movable plate 160 and 110 by means of at least one cable. The retracting mechanism is spring loaded. In this embodiment of the present invention, spring powered motors 171 and 121 are provided, one at each end of a cable spool 170 (and not shown), such that as the hose 180 and 130 is withdrawn from the storage rack 151 and 101, the spring powered motors 171 and 121 are wound up as cables affixed between the cable spool 170 (and not shown) and the movable plates 160 and 110 are extended. When the user wishes to retract the hose 180 and 130, the user activates a switching mechanism 172 and 122 which releases the spring powered motors 171 and 121 and the tension in each spring powered motor 171 and 121 causes the cable spool 170 (and not shown) to rewind, thus causing the associated movable plate 160 and 110 to be moved back towards the cable spool 170 (and not shown) and the spring powered motors 171 and 121. This in turn retracts the hose 180 and 130 and stores it in its associated storage rack 151 and 101.

Those having skill in the art will recognize that spring powered motors 171 and 121 may be electrically powered or hydraulically powered. Also, those having skill in the art will recognize that the spring powered motors 171 and 121 may work in both directions, i.e. the motor may aid the withdrawal and/or retraction of the hose. Also, those having skill in the art will recognize that cable may be any flexible structure such as a wire rope, a chain, a polyester rope, and so on.

The invention is used in the following manner: First, the driver stops at a tank storage facility for pickup. Next, if there is a vent hose attachment point at the tank storage facility, the driver extends the vent hose 180 and attaches it to the tank storage facility. Next, the driver opens the vent valve on the tank truck or tank trailer. Next, after performing level and sedimentary tests on the tank to be pumped from, the driver extends the feed hose 130 and attaches it to the feed distribution point on the tank storage facility. Next, the user opens the feed valve on the tank to be pumped from. Next, the user pumps oil from the tank to be pumped from the tank truck or tank trailer. Next, the user closes the feed valve (and the vent valve if equipped) on the tank pumped from. Next, after performing a level test and recording the results of the test, the user actuates the switching mechanism 122 which causes the spring powered motors 121 to release and the tension in each spring powered motor 121 causes the cable spool (not shown) to rewind, thus causing the associated movable plate 110 to be moved back towards the cable spool (not shown) and the spring powered motors 121. This in turn retracts the hose 130 and stores it in its associated storage rack 101. Next, the user actuates the switching mechanism 172 which causes the spring powered motors 171 to release and the tension in each spring powered motor 171 causes the cable spool 170 to rewind, thus causing the associated movable plate 160 to be moved back towards the cable spool 170 and the spring powered motors 171. This in turn retracts the hose 180 and stores it in its associated storage rack 151. Because feed hose 180 is stored with its open, unconnected end somewhat higher than the bent portion of hose 180 that runs through the hose rollers 161 on movable plate 160 and fluid remaining in the hose flows to the bent area of hose 180 as it runs through the hose rollers 161 on movable plate 160 excess oil is not deposited on the ground or highway.

What is claimed is:

1. An inclined retracting hose tray comprising:
    a) at least two storage racks one stacked on top of the other and affixable to the bottom of a vehicularly attached storage tank;
    b) wherein a first hose is mounted on the lower storage rack with one end of the first hose affixable to a pump on a vehicle and the lower storage rack is tilted down by an arbitrary angle away from the pump on the vehicle;
    c) wherein a second hose is mounted on the upper storage rack with one end of the second hose affixable to a vent pipe on the vehicle;
    d) wherein each storage rack has a fixed plate with two hose rollers affixed and a movable plate with three hose rollers affixed wherein the centermost of the three hose rollers is affixed closer to the fixed plate and the two outboard of the three hose rollers are affixed further from the fixed plate;
    e) wherein each movable plate is motivated by means of a separate cable affixed to a separate motor;
    f) wherein each hose may be extended by pulling its unattached end out from between the two hose rollers affixed to the fixed plate while the motion of the hose being extended retracts the movable plate as the hose runs around the centermost of the three hose rollers on the movable plate guided by the two outboard of the three hose rollers on the movable plate; and
    g) wherein each hose may be retracted into its associated storage rack by actuating a switching mechanism associated with the storage rack activating the separate motor associated with the storage rack operating by means the separate cable affixed to the separate motor.

2. An inclined retracting hose tray of claim 1 wherein the motor is spring powered.

3. An inclined retracting hose tray of claim 1 wherein the motor is electrically powered.

4. An inclined retracting hose tray of claim 1 wherein the motor is hydraulically powered.

5. An inclined retracting hose tray of claim 1 wherein the arbitrary angle is at least 3°.

6. An inclined retracting hose tray of claim 1 wherein the arbitrary angle is at least 2°.

7. An inclined retracting hose tray of claim 1 wherein the arbitrary angle is at least 1°.

8. An inclined retracting hose tray of claim 1 wherein the cable is a wire rope.

9. An inclined retracting hose tray of claim 1 wherein the cable is a chain.

10. An inclined retracting hose tray of claim 1 wherein the cable is a polyester rope.

\* \* \* \* \*